United States Patent [19]

Rutter et al.

[11] Patent Number: 4,700,744

[45] Date of Patent: Oct. 20, 1987

[54] DOUBLE SHUT-OFF FLUID DISPENSER ELEMENT

[76] Inventors: Christopher C. Rutter; Peter N. Thomsen, both of 21063 Cabot Blvd., Hayward, Calif. 94545

[21] Appl. No.: 837,776

[22] Filed: Mar. 10, 1986

[51] Int. Cl.⁴ .................................. F16L 29/00
[52] U.S. Cl. ...................... 137/614.04; 285/350; 222/553; 251/149.6
[58] Field of Search ............ 251/149.6, 339, 342, 251/365; 137/614.03, 614.04; 285/350; 222/505, 506, 509, 545, 549, 553

[56] References Cited

U.S. PATENT DOCUMENTS

| | | | |
|---|---|---|---|
| 2,263,293 | 11/1941 | Ewald | 251/149.6 |
| 3,595,445 | 7/1971 | Buford | 251/342 X |
| 3,726,282 | 4/1973 | Patel | 251/149.6 X |
| 3,729,023 | 4/1973 | Hammond | 251/149.6 X |
| 4,137,930 | 2/1979 | Scholle | 137/614.03 X |
| 4,169,548 | 10/1979 | Bond | 251/339 X |
| 4,245,760 | 1/1981 | Stevenson et al. | 137/637.1 X |
| 4,445,539 | 5/1984 | Credle | 251/149.6 X |
| 4,475,566 | 10/1984 | Haines | 251/342 X |
| 4,629,159 | 12/1986 | Wellenstam | 251/149.6 |

Primary Examiner—Martin P. Schwadron
Assistant Examiner—John C. Fox
Attorney, Agent, or Firm—Linval B. Castle

[57] ABSTRACT

In a bag-in-box fluid dispensing system including a bag fitment sealed over an opening in the fluid bag, a normally closed valved intermediate element sealed in the bag fitment, and a normally closed valved dispenser removably coupled to the valved intermediate element, the intercoupling of the intermediate element and the valved dispenser causing the valves in each unit to open for the passage of fluid from the fluid bag, an improved intermediate element having but two components, the improved element including a housing having a long skirt for passing through the bag fitment and into the fluid bag to prevent blocking of the bag opening, a valve set formed by the deformation of a circular opening in the end of the housing, and a normally closed axially movable valve member for mating with the valve seat and having a valve spring bias provided by the deformation of a novel hemispherical resilient member latched in the bore of the housing.

5 Claims, 3 Drawing Figures

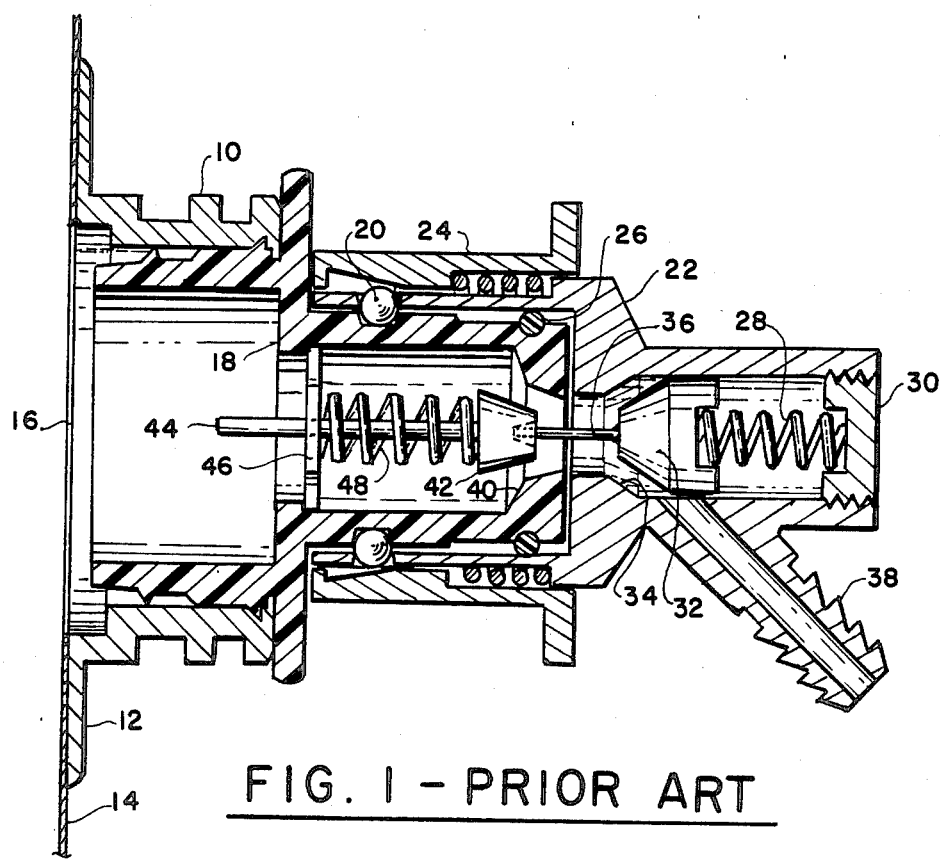
FIG. 1 – PRIOR ART
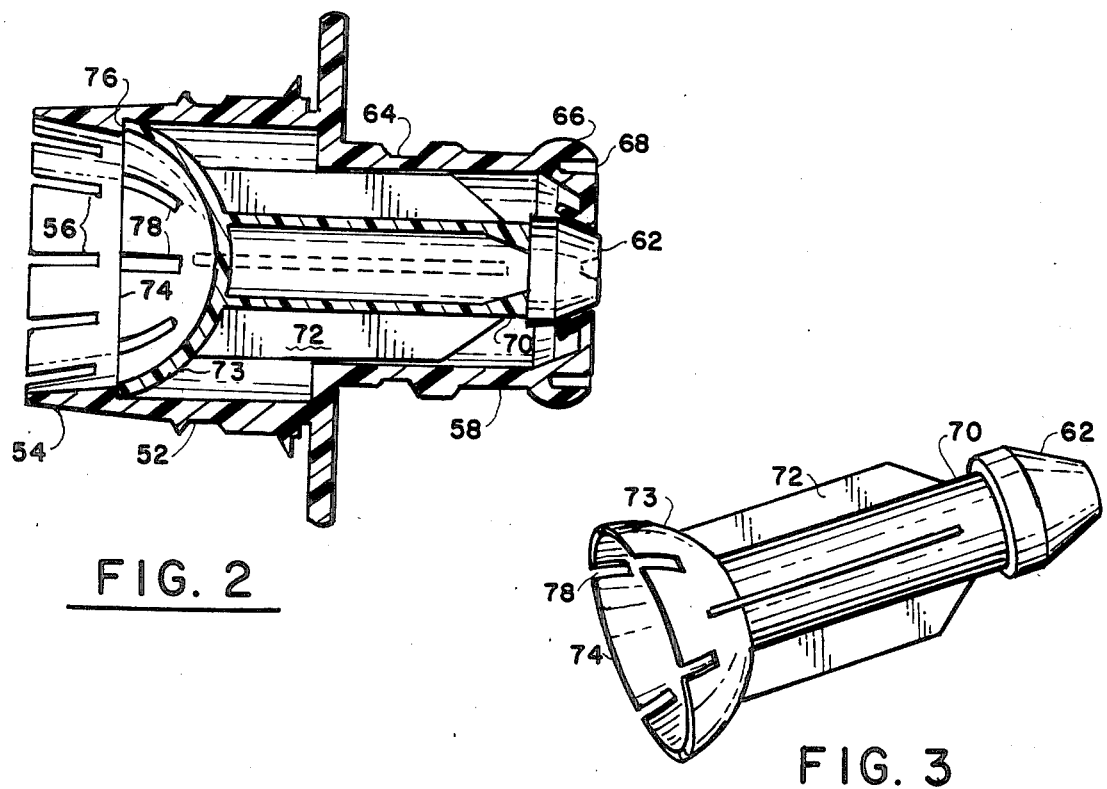
FIG. 2
FIG. 3

DOUBLE SHUT-OFF FLUID DISPENSER ELEMENT

BRIEF SUMMARY OF THE INVENTION

This invention relates to plastic fluid dispensers and in particular to an improved element for double shut-off dispensers used with bulk fluid containers such as the plastic bag-in-box containers.

Such bag-in-box containers are valuable for the bulk storage of various fluids such as wines, extracts, etc. that may be deleteriously affected by exposure to air or other gasses. Fluide is normally packed and sealed in a laminated plastic bag that is impervious to the air or gasses, and the filled bag is placed in a strong outer container such as a corrugated box for storage, shipping, and delivery to the consumer, all without danger of leakage or contamination from exterior elements.

The fluid is dispensed from the bag by several methods; one such dispensing method is described in U.S. Pat. No. 4,355,737, issued Oct. 26, 1982, includes the piercing of the fluid filled bag by a valved dispenser attached to the exterior of the bag and coupled to the box.

A second dispensing method includes the attachment of a tubular fitment to the exterior of the fluid bag and around an opening in the bag. A sealing cap over the fitment, or a tightly valved dispenser element is inserted into the fitment prior to, or after the filling of the bag so that the fluid may be easily and quickly dispensed without the neccessity of piercing the bag. If it is not desired to dispense the fluid at the location of the bulk fluid container, novel double shut-off dispensers have been developed so that tubing to some remote dispensing tap may be coupled to the fluid container and removed therefrom without loss of the fluid or admission of external gasses. Such a double shut-off dispenser has an automatic shut-off valve in the dispensing element in the fitment attached to the fluid containing bag, and a second automatic shut-off valve in the element coupled to the remote delivery tubing. Thus, there is minimal or no leakage during connection and disconnection of the tubing from the bulk container.

The invention described herein concerns this latter type double valved interconnection and provides an improved element for use in the fluid bag fitment. The improved element contains but two parts and is not only much less costly to manufacture, but is formed to prevent fluid blockage caused by the closing of the fluid opening by the opposite interior surface of the bag, a common problem with present dispensing elements.

Briefly described, the improved valving element of the invention includes a resilient housing, a first end of which is formed to be inserted into a conventional fluid bag fitment, the second end of which is formed to mate with a conventional remote tubing valved connector which contains an spring biased axial valve with a coaxial pin for pushing open a corresponding spring biased axial valve in the claimed improved valving element. An additional feature in the improved element is the long slotted skirt at the first end of the element that extends into the fluid bag to prevent the opposite surface of the bag from covering and sealing the dispensing opening.

BRIEF DESCRIPTION OF THE DRAWINGS

In the drawings which illustrate the preferred embodiment of the invention:

FIG. 1 is a sectional drawing illustrating a conventional fitment attached to a fluid bag, the prior art valving element inserted in the fitment, and a conventional remote valved tubing connector coupled to the valving element;

FIG. 2 is a detailed sectional view illustrating the improved valving element; and FIG. 3 is a perspective view of the housing insert of FIG. 2.

DETAILED DESCRIPTION OF THE INVENTION

The Prior Art of FIG. 1

Since the improved valving element of FIG. 2 is designed to operate with two of the three prior art double shut-off dispenser elements, a short description of the prior art of FIG. 1 is first presented.

The double shut-off valve fluid dispenser of FIG. 1 includes a conventional well-known tubular, pliable plastic fitment 10 having an end flange 12 sealed to the surface of a laminated plastic bag fluid container 14 and surrounding an opening 16 in the bag. Inserted and sealed in the bore of the fitment 10 is a first end of a valved element 18 (hereinafter referred to as the "prior art" element). The second tubular end of the element 18 is formed with an external annular ball retaining groove 20 for coupling the element into the bore of a valved tubing connector 22 by a conventional retractable ball lock 24. The second exterior tubular end of the prior art element 18 is sealed to the bore of the first end of the tubing connector 22 by an "O" ring 26.

Axially located in the bore of the second end of the valved tubing connector 22 is a spring 28 positioned between an end cap 30 and the back end of an axially movable valve member 32, the front end of which is conically shaped to mate with a conical valve seat 34 axially formed in the bore of the valved tubing connector 22 between the first and second ends thereof. The valve thus formed is normally closed and opened by an externally applied force exerted against the end of an axial shaft of pin 36 attached to the center of the conical front end of the valve member 32. When thus opened, fluid entering the bore of the member may exit to a tubing through a tubing fitting 38.

The force for moving and opening the valve member 32 of the valved tubing connector 22 is applied by a similar spring and valve arrangement in the bore of the prior art element 18 connected between the fluid bag fitment 10 and the valved tubing connector 22. The second end bore of the element 18 is formed with a conical axial valve seat 40 which mates with a conical valve member 42 axially movable along a shaft 44 that passes through an open spider member 46 locked in the opening between the first and second ends of the bore of the prior art element 18. The spider member 46 is circular with radial arms that engage an annular ledge in the opening between the bore ends of the element 18 so that fluid from the fluid bag may readily pass through the openings between the arms. A spring 48 between the spider member 46 and the conical axial valve forces the valve to close except when forced open by the spring biased pin in the conical valve 32 in the valved tubing connector 22. Thus, intercoupling the valved tubing connector 22 with the prior art element 18 will force the valves in both of the elements to open to release fluid from the fluid bag 14. Similarly, the disconnection of the two members will cause each spring biased valve to instantly close with a minimum of fluid loss.

The prior art valved element 18 described above is installed and sealed by the bag manufacturer or fluid packer and operates very reliably and satisfactorily with the valved tubing connector 22. It is to be noted, however, that the prior art element contains five separate components including housing, "O" ring 26, valve 42, spring 48, and spider 46 and is costly to manufacture and assemble. Another disadvantage with this prior art element 18 is that, when the fluid in the bag becomes low, the opposite surface of the fluid bag may easily cover the bag opening 16 to close it off to prevent further fluid dispensing. The improved valved element illustrated in FIG. 2 overcomes this disadvantage and is considerably less expensive to manufacture thereby making the fluid bag with the attached fitment and valved element suitable as a disposable, non-returnable fluid container.

THE IMPROVEMENT

Illustrated in section in FIG. 2 is an improved valved element 50 that operates in conjunction with the fluid bag fitment 10 and the valved tubing connector 22 and replaces the prior art element 18 of FIG. 1. The improved element comprises only two components, thus it is considerably less expensive than the FIG. 1 element, and additionally includes means for preventing the closing off of fluid by the blocking on the bag opening 16 by the opposite bag surface.

The improved element 50 of FIG. 2 includes a resilient plastic tubular housing, the first end 52 of which is formed to fit and be sealed within the bore of the bag fitment 10 of FIG. 1. A tubular skirt 54 extends beyond the length of the first end 52 of the improved element 50 and when interconnected with a fluid bag fitment, the end of the skirt will terminate within the fluid bag by about one quarter inch to thus prevent the opposite surface of the bag from closing off the bag opening into the fitment. The skirt is formed with a plurality of slits or openings 56 for passing the fluid into the element 50 whenever the bag opening 16 may be sealed off by the opposite bag surface.

The second end 58 of the plastic element 50 is tubular and has at the end thereof a valve seat 60 formed of a thin tubular pliable section that readily deforms from its tubular shape to comply with and seal to the conical surface of an axial movable valve 62. The exterior surface of the second end 58 is formed with an annular groove 64 at an appropriate position for accomodating the balls in the conventional ball lock coupling on a valved tubing connector. As a replacement for the conventional O-ring seal 26 in the prior art element of FIG. 1, the improvement of FIG. 2 employs an annular raised ring 66 adjacent the second end of the pliable housing and overlying an annular end recess 68 so that the raised ring may be readily compressed into a tight seal within the bore of a valved tubing connector.

The second component in the improved valved element 50 is the spring biased valve member illustrated in FIG. 2 and in the perspective view of FIG. 3. The valve member includes the conical valve 62 formed at the end of a tubular section 70 that is axially maintained within the bore of the housing second end 58 by three or more fins 72 extending radially from the tubular section 70 and slidably contacting the second end tubular bore. The end of the tubular valve member opposite the conical valve is substantially a hemisphere 73 and the secodn component is installed in the housing by merely axially pressing the valve member into the housing until the edge 74 at the open end of the hemisphere 73 engages an inward facing annular ledge 76 on the interior surface of the housing first end 52. A plurality of openings in the hemisphere 73 provide fluid passages from the bag fitment 10 through the improved element 50. The thin hemispherical portion of the platic tubular valve member provides the resiliency for the required bias that forces the conical valve 62 to seal against the deformable valve seat 60, and also provides the necessary force to exert against the spring biased valve pin of a valved tubing connector 22 coupled to the valved element 50.

Having thus described the invention, what is claimed is:

1. An improved valved element for interconnection between a tubular fitment sealed around an opening in a fluid container and extending from the exterior surface of the container, and a valved fluid dispensing member having a normally closed valve having an axially movable spring biased valve opening member, said improved valved element comprising:

a resilient housing having first and second tubular ends, said first tubular end being sealable within the tubular fitment said second end being closed with an axial valve seat opened toward said valved fluid dispensing member;

an annular resilient ring formed around the second end of said resilient housing for sealing said housing to said dispensing member, said ring formed in said resilient housing and overlying an annular groove formed in the second end of said housing;

a tubular extension skirt on said first tubular end, said skirt extendable through the fluid container opening into the fluid container, said skirt having openings for the passage of fluid therethrough; and elongated valve means axially movable within said resilient tubular housing and having a valve member at a second end and positioned to be axially moved into and from said valve seat by the spring biased valve opening member in said valved fluid dispensing member, said elongated valve means having a first end resiliently coupled to the interior surface of the first tubular end of said resilient housing, said elongated valve means remaining axially centered within said tubular housing by at least three longitudinally elongated fins radially extending from said valve means.

2. The valved element of claim 1 wherein said elongated valve means includes an axially movable resilient conical valve member and wherein the second end of said resilient housing has formed therein a tubular seat, said seat being the tubular wall of an opening in said resilient housing second end that is deformable from its tubular shape to the conical shape of said axially movable resilient conical valve member when said valve member is closed.

3. The valved element of claim 2 wherein the first end of said elongated valve means is substantially hemispherical and is locked in the first end of said tubular housing against axial movement, the resiliency of said hemispherical first end providing bias for urging said valve member toward said axial valve seat.

4. The valved element of claim 3 wherein the hemispherical portion of said elongated valve means contains a plurality of openings for the passage of fluid therethrough.

5. The valved element of claim 4 wherein said first end of said housing is formed with an interior ledge for locking said hemispherical first end of said elongated valve means against axial movement toward the first end of said housing.

* * * * *